United States Patent Office 3,543,270
Patented Nov. 24, 1970

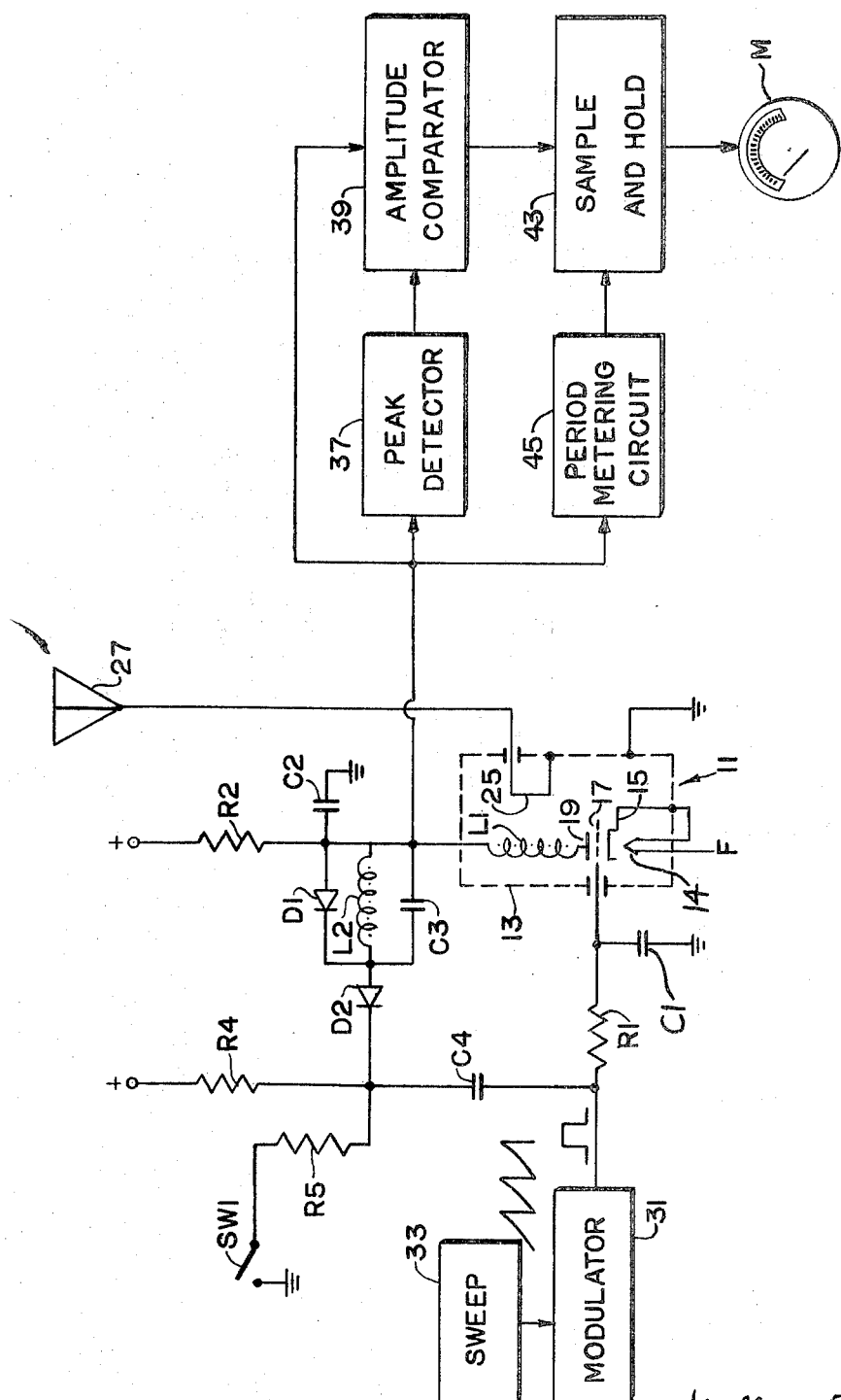

3,543,270
RADAR ALTIMETER
Wallace F. Wiley, Jr., Prairie Village, Kans., assignor to Bonzer Inc., Shawnee, Kans., a corporation of Kansas
Filed Dec. 5, 1968, Ser. No. 781,463
Int. Cl. G01s 9/06, 7/40
U.S. Cl. 343—13                           12 Claims

ABSTRACT OF THE DISCLOSURE

The radar altimeter disclosed herein employs a super-regenerative oscillator as both transmitter and receiver. The oscillator includes an amplifying device having an input terminal and an output terminal. For testing the altimeter, a signal delay means is connected between the output terminal and the input terminal to cause the operation of the oscillator to simulate the operation which occurs when a target is present.

BACKGROUND OF THE INVENTION

This invention relates to radar altimeters and more particularly to a radar altimeter which employs a super-regenerative oscillator and which includes test means for simulating the presence of a reflective target at a predetermined range.

In a radio frequency super-regenerative oscillator which is operative to generate bursts of oscillations at a radio frequency which is characteristic of the oscillator, there is a period occurring just prior to each burst of oscillations during which the operation of the oscillator is quite sensitive to received energy at the characteristic frequency. The oscillator will thus function as a sensitive detector of received energy at the characteristic frequency during such periods.

It has previously been known to employ such a super-regenerative oscillator for radar purposes by utilizing the bursts of oscillations provided thereby as the transmitted pulses and by employing the sensitive period preceding each burst for detecting signals reflected from a target. One use for such radars has been as radar altimeters. However, in manufacturing such altimeters, there has been a need for some method of testing the operation of the radar apparatus without actually providing a target, that is, without providing some means for reflecting transmitted energy with a delay corresponding to the presence of a target at a predetermined range.

Among the several objects of the present invention may be noted the provision of radar apparatus incorporating test means for simulating the presence of a target at a predetermined range; the provision of a radar altimeter incorporating test means which will test substantially all components thereof; the provision of such test means which will not interfere with the normal operation of the radar apparatus; the provision of such a test means which is highly reliable; and the provision of such a test means which is relatively simple and inexpensive. Other objects and features will be in part apparent and in part pointed out hereafter.

SUMMARY OF THE INVENTION

Briefly, radar apparatus according to the present invention employs a radio frequency super-regenerative oscillator including an amplifying device having an input terminal and an output terminal. The oscillator is operative to generate bursts of oscillations at a radio frequency which is characteristic of the oscillator, there being a period just prior to each burst of oscillations during which the oscillator is sensitive to received energy at the characteristic frequency. Each burst of oscillations also produces a relatively low frequency pulsation at the output terminal of the amplifying device. Means are provided for controlling the biasing of the oscillator to vary the period between bursts of oscillations and other means are provided for detecting changes in the operation of the oscillator which are caused by the reception of radio frequency energy, thereby to determine when the period between successive bursts of oscillations corresponds to the range to a reflective target. The operation of the radar apparatus is tested by selectively connecting a signal delay means between the output terminal and the input terminal of the amplifying device so as to nominally vary the biasing of the input terminal as a delayed function of the low frequency pulsations generated at the output terminal. Accordingly, when the low frequency pulsations are thus coupled to the input terminal, the operation of the oscillator simulates the presence of a target when the period between successive bursts of oscillations corresponds to the delay provided by the signal delay means

BRIEF DESCRIPTION OF THE DRAWING

The drawing is a diagram, partially in block form and partially in schematic form, of a radar altimeter employing test means of this invention.

DESCRIPTION OF THE PREFERRED EMBODIMENT

Referring now to the drawing, a super-regenerative oscillator is indicated generally at 11. Oscillator 11 employs a cavity resonator, indicated at 13. Within the cavity is mounted a vacuum tube having a heater 14 which is energized from a suitable source (not shown), a cathode 15 which is grounded to the cavity, a grid 17 and a plate 19. Biasing is selectively applied to the grid 17 through a resistor R1, radio frequency bypassing being provided by a capacitor C1. Plate current is provided from a suitable positive source (not shown), through a load resistor R2 and a R.F. choke L1 which provides suitable radio frequency decoupling within the cavity. A capacitor C2 is connected from the junction between resistor R2 and choke L1 to ground. The vacuum tube functions as an amplifying device in which the grid 17 comprises one of the input circuit terminals and the plate 19 comprises one of the output circuit terminals. The parameters of the circuit are selected and the vacuum tube is mounted within cavity 13 in a manner understood by those skilled in the art, so that, when the tube is biased into conduction, bursts of super-regenerative oscillations are periodically generated within the cavity 13. A probe loop 25 is provided for bi-directionally coupling R.F. energy between the cavity 13 and an antenna 27.

Oscillator 11 is periodically biased into super-regenerative oscillation by a modulator circuit 31. Modulator 31, which may for example comprise an essentially astable multivibrator, repetitively applies bias pulses to the grid circuit of the oscillator, the duration of each bias pulse being only long enough to product one burst of oscillations. Each bias pulse may, for example, be constituted by an essentially square wave pulse, as indicated adjacent the modulator output lead.

The repetition rate at which the bias pulses are repeated is controlled by a sweep circuit 33. The sweep circuit provides a substantially sawtooth shaped waveform, as indicated, so that the pulse repetition rate is varied smoothly from a slow rate to a fast rate. As will be apparent, the slow repetition rate corresponds to a relatively long range while the fast rate corresponds to a relatively short range.

Each time the oscillator 11 burst into oscillation, a relatively low frequency, negative-going pulsation is generated in the plate or output circuit of the oscillator due to the fluctuation in load current. This pulsating signal is typically referred to as the squeg signal and the pulsations as squeg pulses. As is understood by those skilled in the art, the amplitudes of the negative-going squeg pulsations will decrease if R.F. energy at the oscillator's characteristic frequency is received during the sensitive periods or intervals which precede each burst of oscillations. In other words, the operation of the oscillator will be affected if R.F. energy, generated during one burst of oscillations, is reflected from a target and received back at the oscillator during the sensitive period which precedes a subsequent burst of oscillations. Such a condition will occur when the interval between successive bias pulses provided by modulator 31 corresponds to the return time of R.F. energy bounced back from a reflective target.

The low frequency pulsations generated in the plate circuit of the oscillator 11 are applied to a peak detector circuit 37, which detects the negative peaks. Detector circuit 37 is operative to provide a signal which is a function of the peak amplitudes of the squeg pulsations. Since the amplitudes of the negative-going squeg pulsations are decreased when reflected energy is received during the sensitive periods, the signal provided by the peak detector circuit will become more positive when reflected energy is received. Thus, as the pulse repetition rate approaches that rate which corresponds exactly to the perpendicular distance between the altimeter and ground, energy reflected along oblique paths to ground will cause the signal from detector 37 to rise gradually. When the repetition rate exactly corresponds to the perpendicular distance, the signal from the detector will reach a positive peak and will then drop abruptly. In other words, a negative-going transient is generated as the actual repetition rate passes that rate which corresponds to the perpendicular distance.

The signal provided by detector 37 is applied to an amplitude comparator 39 which triggers a sample and hold circuit 43 when the negative-going transient occurs. Subsequent transients within the same sweep cycle are ignored. The circuit 43 samples the output signal of a period metering circuit 45 and applies the held signal to a meter M. The period metering circuit 45 provides an output signal which varies substantially in proportion to the period between successive bursts of oscillations.

The circuitry thus far described operates to provide an altitude measurement substantially as follows. The sweep circuit 33 cyclically varies the rate at which bursts of oscillations are repeated. When the period between successive bursts corresponds to the return time of a signal reflected from the target, i.e., ground, the sample and hold circuit 43 is triggered so that the indication provided by meter M is representative of that burst interval period which corresponds to the target range. Accordingly, the meter indication is also an indication of altitude when the reflective target is ground.

In order to test the operation of the radar altimeter apparatus thus far described, the biasing of the oscillator 11 is nominally varied as a delayed function of the squeg pulsations generated in the plate or output circuit. Delaying of the squeg pulsation signal is provided principally by means of an inductor L2 one end of which is connected to the plate circuit between resistor R2 and choke L1. A capacitor C3 of selected value may be connected across conductor L2 to adjust its delay time or resonant frequency in relation to the distributed capacitances in the circuit. A diode D1 is connected across inductor L2 as shown. It is a present believed that this diode prevents continued ringing of the delay circuit which includes inductor L2 without preventing the application of a delayed pulsation to the input circuit of the oscillator.

The delayed pulsation provided at the left hand side of inductor L2 is applied to the oscillator tube grid 17 through resistor R1, a coupling capacitor C4 and a diode D2. Diode D2 acts as a switch for selectively connecting or disconnecting the delay circuit to the grid circuit. Biasing of diode D2 is controlled by means of a pair of resistors R4 and R5. The resistor R4 is connected to a suitable positive source and the resistor R5 is selectively connected to ground through a switch SW1. When switch SW1 is open, diode D2 is strongly reverse-biased so that the diode exhibits a very high impedance. The left hand side of diode D2 thus essentially floats and the grid circuit is essentially isolated from any A.C. signals which may be present at the left hand side of inductor L2. In other words, the delay circuit including inductor L2 has no substantial effect on the operation of the altimeter when switch SW1 is open. When switch SW1 is closed, however, diode D2 is forward biased and exhibits a very low impedance so that A.C. signals transmitted through the inductor L2 are coupled, through capacitor C4 and resistor R1, to the grid 17.

The operation of inductor L2 is to cause the biasing applied to the oscillator to vary as a delayed function of the low frequency squeg pulsations generated in the plate circuit of the oscillator. As is understood by those skilled in the art, the operation of the oscillator 11 is affected by its biasing as well as by the reception of reflected energy. Thus, the delayed signal coupled through inductor L2 from the plate circuit to the grid circuit will cause a substantial change in the operation of the oscillator when the delayed signal cancels or reduces the bias pulses, that is when the delay provided by the inductor coincides with or corresponds to the interval between successive bias pulses provided by the modulator circuit 31. Accordingly, at some particular bias pulse repetition rate, the delayed squeg signal and the bias pulse will oppose each other in biasing the oscillator and will thereby affect its operation in a manner which simulates the reception of reflected energy, including the generation of smaller negative-going squeg pulses. The correspondence between the test circuit delay and the bias pulse repetition period will thus cause the sample hold circuit 43 to be triggered so that the meter M will register an altitude corresponding to that pulse repetition period which produced the target simulating operation. Thus, by properly selecting the values of inductor L2 and capacitor C3, the meter M can be caused to register a predetermined altitude when the test switch SW1 is closed.

Since the test delay circuit provides an output signal simulating the presence of the target only when the bias pulse period corresponds to the delay provided by inductor L2, it can be seen that the test circuit not only provides a check on the operation of the detection and indicating circuitry which responds to the squeg pulse signal, but it also provides a check on the proper operation of the sweep circuit 33 and the modulator 31 which must vary the bias pulse repetition period through the desired value before a proper indication will be obtained.

In view of the above, it will be seen that the several objects of the present invention are achieved and other advantageous results are attained.

As various changes could be made in the above construction without departing from the scope of the invention, it is intended that all matter contained in the above description or shown in the accompanying drawings shall be interpreted as illustrative and not in a limiting sense.

What is claimed is:

1. Radar apparatus comprising:
   a radio frequency super-regenerative oscillator including an amplifying device having an input terminal and an output terminal, said oscillator being operative to generate bursts of oscillations at a radio frequency which is characteristic of said oscillator, there being a period just prior to each burst of oscillations during which said oscillator is sensitive to received energy at said characteristic frequency, each burst of oscillations producing a relatively low frequency pulsation at said output terminal;
   means for controlling the biasing of said oscillator to vary the period between said bursts of oscillations;
   means for detecting changes in the operation of said oscillator caused by the reception of radio frequency energy at said characteristic frequency during said sensitive period thereby to determine when the period between successive bursts of oscillations corresponds to the range to a reflective target;

signal delay means; and means for selectively connecting said delay means between said output terminal and said input terminal for selectively coupling low frequency pulsations from said output terminal to said input terminal thereby to nominally vary the biasing of said input terminal as a delayed function of the low frequency pulsations generated at said output terminal whereby, when said pulsations are so coupled, the operation of said oscillator simulates the presence of a target when the period between successive bursts of oscillations corresponds to the delay provided by said delay means.

2. Apparatus as set forth in claim 1 wherein said delay means comprises an inductor.

3. Apparatus as set forth in claim 2 wherein said amplifying device is a vacuum tube having a grid, a plate and a cathode and wherein said inductor is selectively connected in a circuit from said plate to said grid.

4. Apparatus as set forth in claim 2 including a diode connected across said inductor.

5. Apparatus as set forth in claim 4 including a trimming capacitor also connected across said inductor.

6. Apparatus as set forth in claim 1 wherein said means for selectively connecting said delay means between said output terminal and said input terminal includes a diode and means for selectively controlling the biasing of said diode whereby said low frequency pulsations are coupled through said diode when it is forward biased and are blocked when it is reverse biased.

7. Apparatus as set forth in claim 6 wherein said means for selectively connecting said delay means between said input terminal and said output terminal includes a capacitor for coupling A.C. signals from said diode to said input terminal.

8. Apparatus as set forth in claim 1 wherein said means for controlling the biasing of said oscillator includes means for applying bias pulses to said input terminal, the duration of each bias pulse being sufficient to produce one burst of oscillations, and means for varying the repetition rate of said bias pulses.

9. Apparatus as set forth in claim 1 wherein said means for detecting changes in the operation of said oscillator includes means for providing a signal having an amplitude which varies as a function of the duration of that period between successive bursts which produces a detected change in the operation of said oscillator.

10. Apparatus as set forth in claim 1 wherein said means for detecting changes in the operation of said oscillator includes means for providing a period signal having an amplitude which varies as a function of the interval between successive bursts of oscillations and a sample and hold circuit for sampling said period signal when the amplitude of said low frequency pulsations exceeds a predetermined level.

11. Radar apparatus comprising:

a radio frequency super-regenerative oscillator including an amplifying device having an input terminal and an output terminal, said oscillator being operative, when biased, to generate bursts of oscillations at a radio frequency which is characteristic of said oscillator, there being a period just prior to each burst of oscillations during which said oscillator is sensitive to received energy at said characteristic frequency, each burst of oscillations producing a relatively low frequency pulsation at said output terminal;

means for applying bias pulses to said input terminal at an adjustable repetition rate, the duration of each bias pulse being sufficient to produce only one burst of oscillations;

sweep means for cyclically varying said repetition rate;

means for detecting variations in the amplitude of said low frequency pulsations caused by the reception of radio frequency energy at said characteristic frequency during said sensitive period thereby to determine when the period between successive bursts of oscillations corresponds to the range to a reflective target;

signal delay means including an inductor; and test circuit means for selectively connecting said delay means between said output terminal and said input terminal for selectively coupling low frequency pulsations from said ouptut terminal to said input terminal thereby to nominally vary the biasing of said input terminal as a delayed function of the low frequency pulsations generated at said output terminal whereby, when said pulsations are so coupled, the operation of said oscillator simulates the presence of a target when the pulse repetition rate corresponds to the delay provided by said delay means.

12. Radar apparatus comprising;

a radio frequency super-regenerative oscillator including an amplifying device having an input terminal and an output terminal, said oscillator being operative, when biased, to generate bursts of oscillations at a radio frequency which is characteristic of said oscillator, there being a period just prior to each burst of oscillations during which said oscillator is sensitive to received energy at said characteristic frequency, each burst of oscillations producing a relatively low frequency pulsation at said output terminal;

means for applying bias pulses to said input terminal at an adjustable repetition rate, the duration of each bias pulse being sufficient to produce only one burst of oscillations;

sweep means for cyclically varying said repetition rate;

means for providing a period signal having an amplitude which varies as a function of the interval between successive bursts of oscillations;

a sample and hold circuit which, when triggered, samples said period signal;

means for detecting the peak amplitude of said low frequency pulsations;

means for triggering said sample and hold circuit in response to variations in the peak amplitude of said low frequency pulsations;

signal delay means including an inductor and a diode connected across said inductor; and test circuit means for selectively connecting said delay means between said output terminal and said input terminal for selectively coupling low frequency pulsations from said output terminal to said input terminal thereby to nominally vary the biasing of said input terminal as a delayed function of the low frequency pulsations generated at said output terminal whereby, when said pulsations are so coupled, the operation of said oscillator simulates the presence of a target at a predetermined range corresponding to the delay provided by said delay means and said sample and hold circuit provides a held signal level corresponding to said predetermined range.

References Cited

UNITED STATES PATENTS 2,961,653  11/1960  Bogle _____ 343—13
3,354,457  11/1967  Pfab et al. _____ 343—17.7

R. D. BENNETT, Jr., Primary Examiner

T. H. TUBBESING, Assistant Examiner

U.S. Cl. X.R.

343—17.7